(12) United States Patent
Phillips

(10) Patent No.: US 10,959,508 B1
(45) Date of Patent: Mar. 30, 2021

(54) PADDED GLASSES CLIP APPARATUS

(71) Applicant: William Phillips, Lake Havasu City, AZ (US)

(72) Inventor: William Phillips, Lake Havasu City, AZ (US)

( * ) Notice: Subject to any disclaimer, the term of this patent is extended or adjusted under 35 U.S.C. 154(b) by 0 days.

(21) Appl. No.: 16/735,179

(22) Filed: Jan. 6, 2020

(51) Int. Cl.
*A45F 5/02* (2006.01)
*F16B 2/10* (2006.01)
*A44B 1/38* (2006.01)

(52) U.S. Cl.
CPC .................. *A45F 5/02* (2013.01); *A44B 1/38* (2013.01); *F16B 2/10* (2013.01); *A45F 2200/0541* (2013.01)

(58) Field of Classification Search
CPC .................. A45F 5/02; A44B 1/38; F16B 2/10
See application file for complete search history.

(56) References Cited

U.S. PATENT DOCUMENTS

| | | | | |
|---|---|---|---|---|
| 3,649,954 A | * | 3/1972 | Kurtz ...................... | H01R 11/22 439/437 |
| 3,881,228 A | * | 5/1975 | Takabayashi .......... | A44B 99/00 24/504 |
| 3,914,828 A | * | 10/1975 | Noda ........................ | A41F 3/02 24/504 |
| 4,005,510 A | * | 2/1977 | Noda ........................ | A41F 3/02 24/504 |
| 4,722,120 A | * | 2/1988 | Lu ............................. | B42F 1/10 24/489 |
| 4,949,432 A | | 8/1990 | Wisniewski | |
| 5,235,727 A | | 8/1993 | McCloskey | |
| 5,408,728 A | | 4/1995 | Wisniewski | |
| 5,941,487 A | | 8/1999 | Keely | |
| 6,210,003 B1 | * | 4/2001 | Chan ........................ | G02C 3/04 24/3.3 |
| 6,564,432 B1 | | 5/2003 | Kushner | |
| 7,200,897 B2 | | 4/2007 | Silvestro | |
| D549,417 S | * | 8/2007 | Siegel ............................ | D32/61 |
| 7,537,142 B2 | * | 5/2009 | Yau ........................ | A47G 25/485 223/85 |
| 7,553,018 B1 | | 6/2009 | Riazi | |
| 7,850,302 B1 | * | 12/2010 | Riazi ........................ | A45F 5/02 24/3.3 |
| D649,581 S | | 11/2011 | Foulger | |
| 8,201,310 B1 | * | 6/2012 | Abdi ....................... | A47G 25/48 24/499 |
| 8,295,533 B1 | * | 10/2012 | Schachtman ............. | A45F 5/00 224/257 |

(Continued)

FOREIGN PATENT DOCUMENTS

WO    WO0030488    6/2000

*Primary Examiner* — Robert Sandy
*Assistant Examiner* — David M Upchurch

(57) ABSTRACT

A padded glasses clip apparatus for preventing misplacement or damage to glasses includes a clip body comprising an upper clip and a lower clip pivoting on a pivot rod between a closed position and an open position. A torsion spring is coupled to the pivot rod and engages a clip inner side of each of the upper clip and the lower clip to bias the clip body towards the closed position. A pair of pads includes an upper pad and a lower pad coupled to the clip inner side of the upper clip and the lower clip, respectively. Each pad extends between the pair of pivot ears and the grip portion. The pair of pads safely secures a pair of arms of a pair of glasses.

9 Claims, 4 Drawing Sheets

(56) References Cited

U.S. PATENT DOCUMENTS

| | | |
|---|---|---|
| 9,737,131 B1 | 8/2017 | Oaks |
| 9,999,719 B2 * | 6/2018 | Kitchen .............. A61M 5/1415 |
| D836,337 S * | 12/2018 | Stark .............................. D3/266 |
| 2003/0040285 A1 * | 2/2003 | Whitley .................... A45F 5/00 |
| | | 455/575.1 |
| 2003/0126725 A1 * | 7/2003 | Housley .............. A47G 25/485 |
| | | 24/510 |
| 2003/0188403 A1 * | 10/2003 | Lemke .............. A61M 16/0683 |
| | | 24/338 |
| 2005/0257353 A1 * | 11/2005 | Rohrig ..................... A45F 5/02 |
| | | 24/537 |
| 2010/0115739 A1 * | 5/2010 | Mathur .................... A45F 5/02 |
| | | 24/306 |
| 2014/0096347 A1 * | 4/2014 | Rokvic .............. E04F 11/1853 |
| | | 24/530 |
| 2016/0157568 A1 * | 6/2016 | Struminger ........... D06F 95/008 |
| | | 24/298 |
| 2018/0320867 A1 * | 11/2018 | Chang .................. F21V 21/088 |

* cited by examiner

PADDED GLASSES CLIP APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to glasses accessory devices and more particularly pertains to a new glasses accessory device for preventing misplacement or damage to glasses.

(2) Description of Related Art Including Information Disclosed Under 37 CFR 1.97 and 1.98

The prior art relates to glasses accessory devices utilizing a clip to secure glasses. Most existing devices incorporate a clip to attach the device to an object and a secondary clip or attachment means for the glasses. Such devices may be bulky or break more easily than a singular clip device.

BRIEF SUMMARY OF THE INVENTION

An embodiment of the disclosure meets the needs presented above by generally comprising a clip body comprising an upper clip and a lower clip. Each of the upper clip and the lower clip have a clip back end, a clip front end, a clip left side, a clip right side, a clip outer side, and a clip inner side. Each of the upper clip and the lower clip have a pair of pivot ears extending from the clip inner side. Each pivot ear has a pivot aperture extending therethrough. The pair of pivot ears of the lower clip is positioned adjacent the pair of pivot ears of the upper clip such that the pivot aperture of each pivot ear is aligned. The clip inner side of each of the upper clip and the lower clip has a grip portion adjacent the clip front end. A pivot rod is coupled to the clip body and extends through the pivot aperture of each pivot ear. The clip body pivots on the pivot rod between a closed position with the clip front end of the upper clip contacting the clip front end of the lower clip and an open position with the clip back end of the upper clip contacting a clip back end of the lower clip. A torsion spring is coupled to the pivot rod and engages the clip inner side of each of the upper clip and the lower clip to bias the clip body towards the closed position. A pair of pads comprises an upper pad and a lower pad coupled to the clip inner side of the upper clip and the lower clip, respectively. Each pad extends between the pair of pivot ears and the grip portion. The pair of pads is configured to secure a pair of arms of a pair of glasses.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
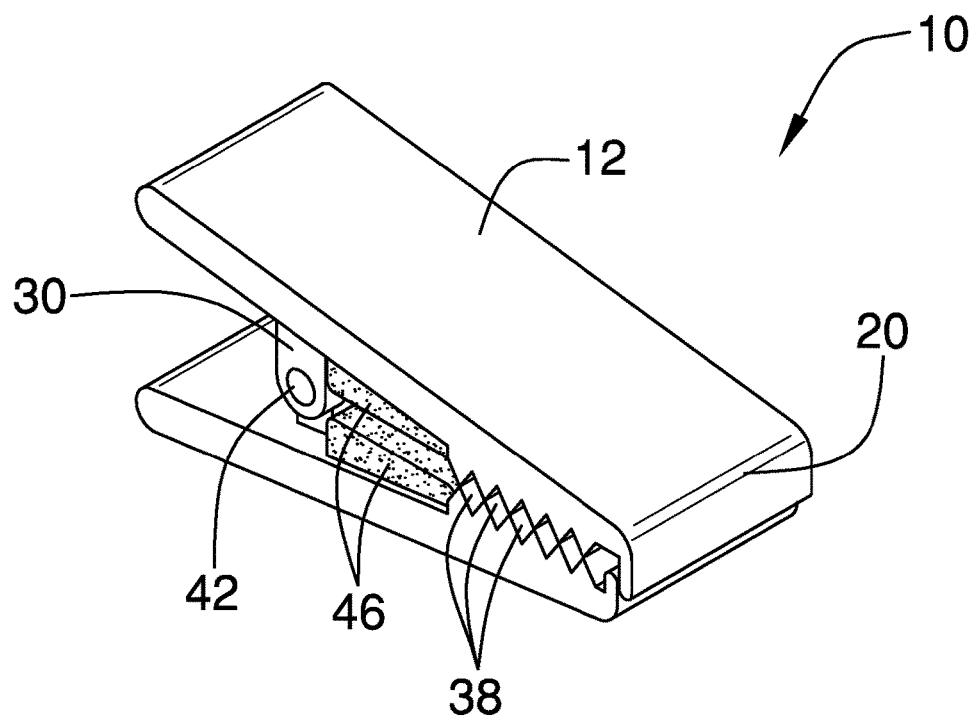
FIG. 1 is an isometric view of a padded glasses clip apparatus according to an embodiment of the disclosure.
Figure 2:
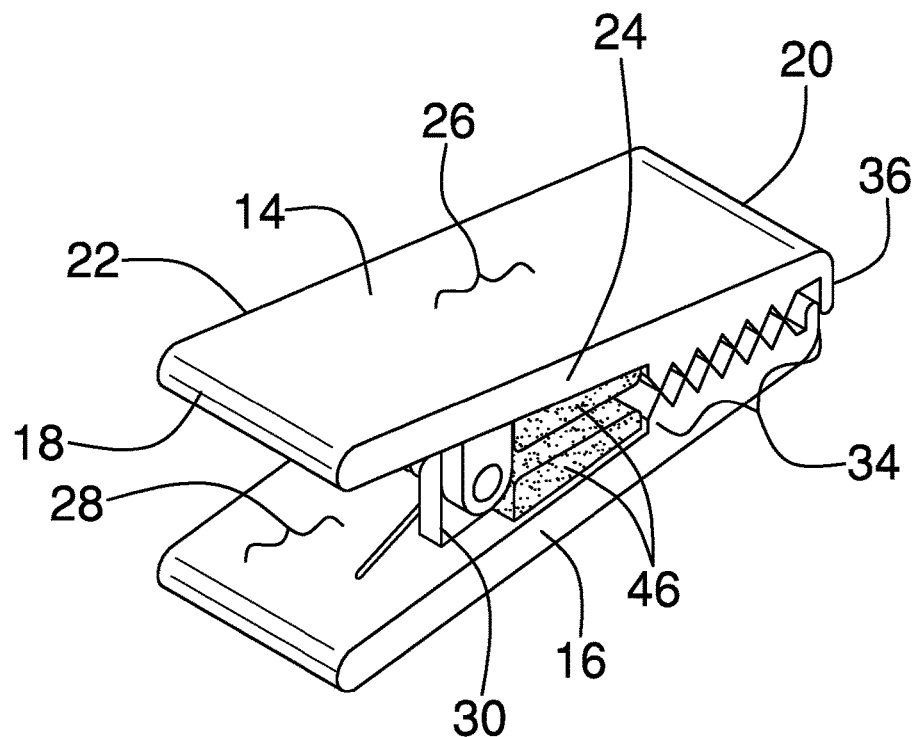
FIG. 2 is an isometric view of an embodiment of the disclosure.
Figure 3:
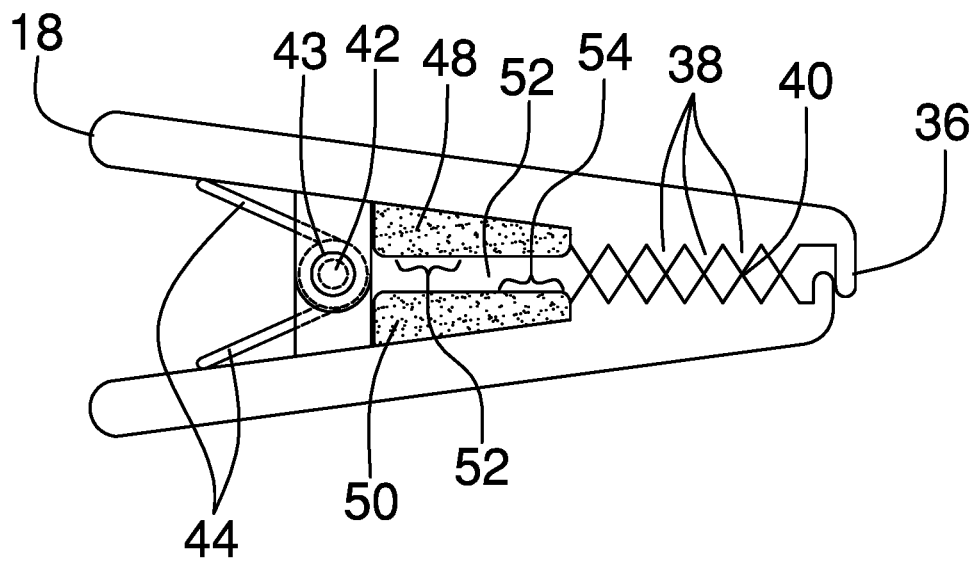
FIG. 3 is a side elevation view of an embodiment of the disclosure.
Figure 4:
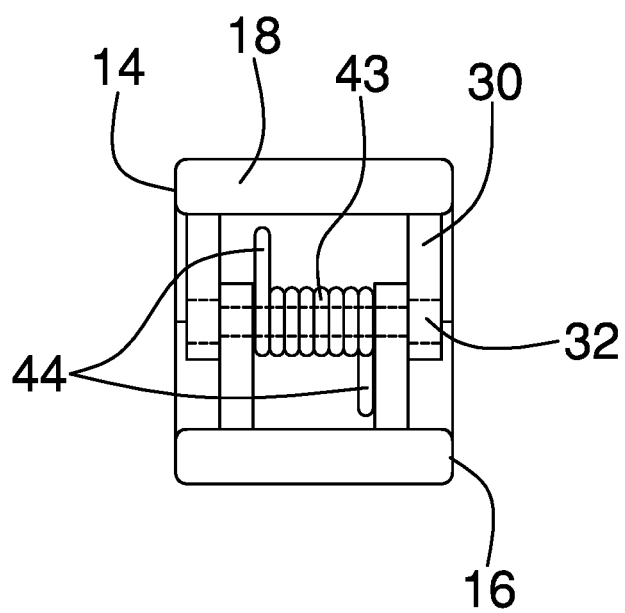
FIG. 4 is a rear elevation view of an embodiment of the disclosure.
Figure 5:
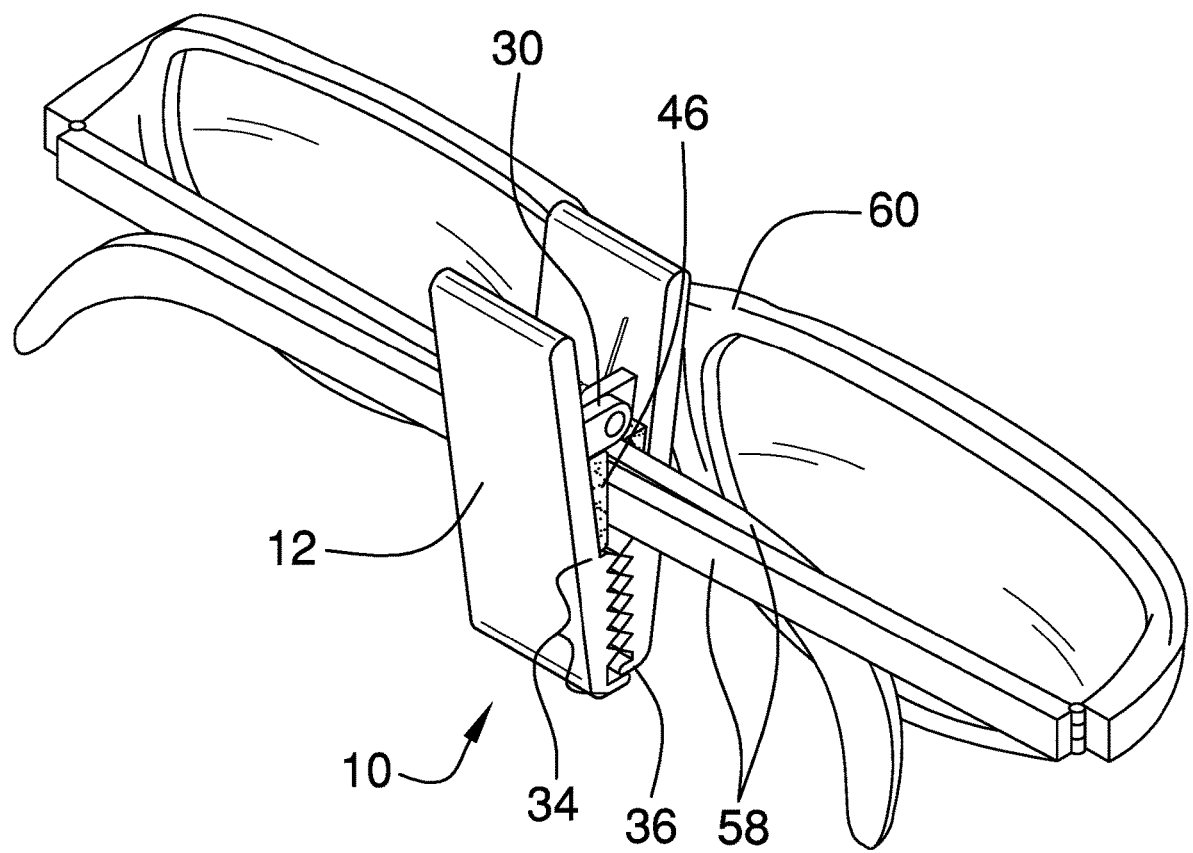
FIG. 5 is an in-use view of an embodiment of the disclosure.
Figure 6:
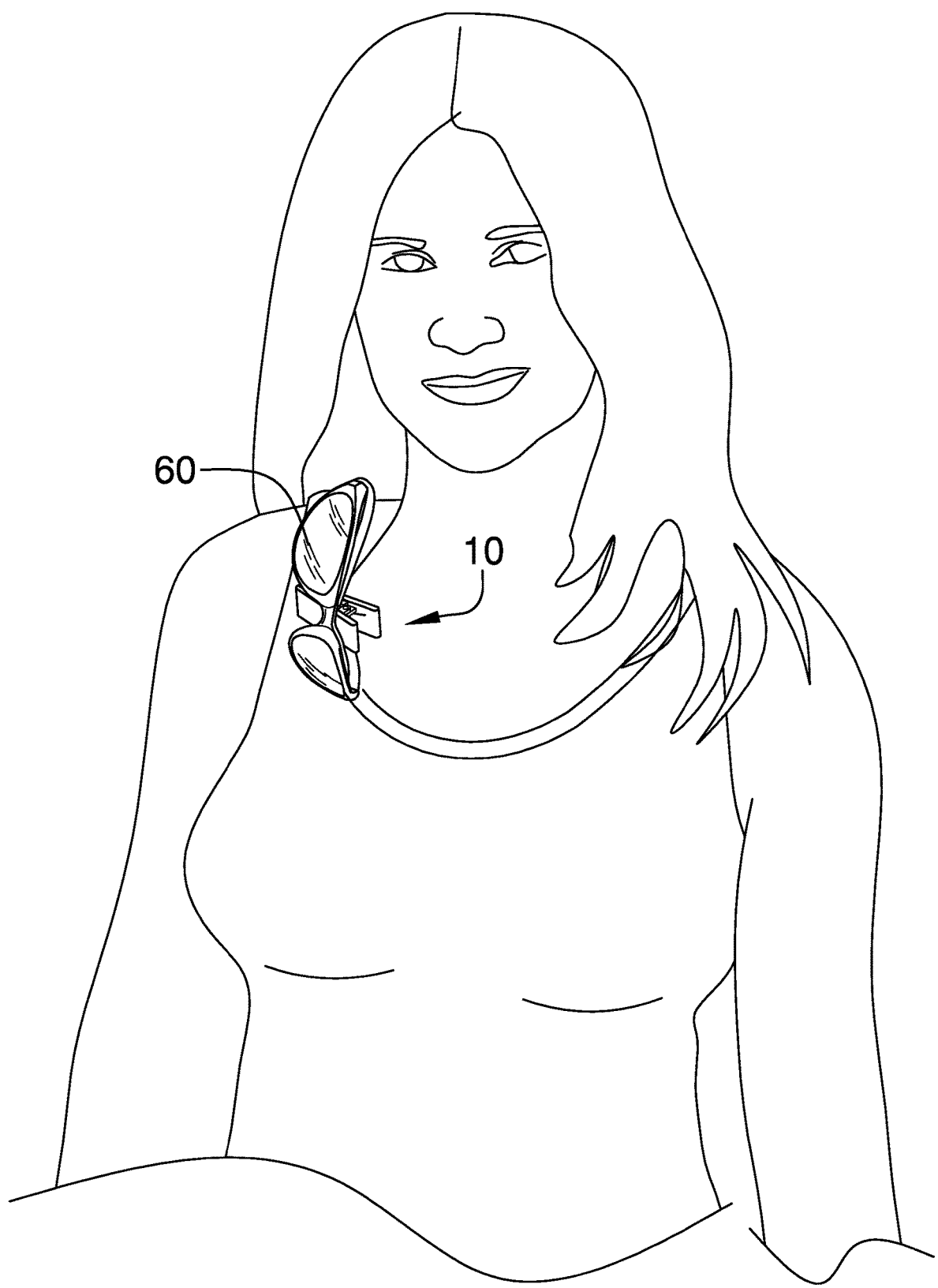
FIG. 6 is an in-use view of an embodiment of the disclosure.

With reference now to the drawings, and in particular to FIGS. 1 through 6 thereof, a new glasses accessory device embodying the principles and concepts of an embodiment of the disclosure and generally designated by the reference numeral 10 will be described.

As best illustrated in FIGS. 1 through 6, the padded glasses clip apparatus 10 generally comprises a clip body 12 comprising an upper clip 14 and a lower clip 16. Each of the upper clip 14 and the lower clip 16 has a clip back end 18, a clip front end 20, a clip left side 22, a clip right side 24, a clip outer side 26, and a clip inner side 28. The clip back end 18 may be rounded for user comfort when the apparatus 10 is worn against the skin. Each of the upper clip 14 and the lower clip 16 has a pair of pivot ears 30 extending from the clip inner side 28. Each pivot ear 30 has a pivot aperture 32 extending therethrough. The pair of pivot ears 30 of the lower clip 16 may be positioned within the pair of pivot ears 30 of the upper clip 14 such that the pivot aperture 32 of each pivot ear is aligned. Each pair of pivot ears 30 may extend parallel to one another.

The clip inner side 28 of each of the upper clip 14 and the lower clip 16 has a grip portion 34 adjacent the clip front end 20. The grip portion 34 of each of the upper clip 14 and the lower clip 16 may have a claw hook 36 adjacent the clip front end 20 and a plurality of teeth 38 adjacent the claw hook 36. The clip front end 20 may be rounded between the clip outer side 26 and the claw hook 36 for user comfort when worn against the skin. Each tooth 38 of the plurality of teeth may be triangular prismatic and has a point 40.

A pivot rod 42 is coupled to the clip body 12 and extends through the pivot aperture 32 of each pivot ear. The clip body 12 pivots on the pivot rod 42 between a closed position with the clip front end 20 of the upper clip 14 contacting the clip front end 20 of the lower clip 16 and an open position with the clip back end 18 of the upper clip 14 contacting a clip back end 18 of the lower clip 16. The claw hook 36 of the upper clip 14 may overlap and lie parallel to the claw hook 36 of the lower clip 16 when the clip body 12 is in the closed position. The claw hook 36 of the upper clip 14 and the claw hook 36 of the lower clip 16 thus close with an overbite rather than directly aligning in order to create a more secure grip on an article of clothing 35. The claw hook 36 of the upper clip 14 may be longer than the claw hook 36 of the lower clip 16 to facilitate said overbite. The point 40 of each tooth 38 of the plurality of teeth of the upper clip 14 may contact the point 40 of the opposing tooth 38 of the plurality of teeth of the lower clip 16 when the clip body 12 is in the closed position rather than the plurality of teeth 38 of the upper clip 14 the plurality of teeth 38 of the lower clip 16 being staggered.

A torsion spring 43 is coupled to the pivot rod 42. The torsion spring 43 may be positioned around the pivot rod 42 between the pair of pivot ears 30 of the lower clip 16 and engages the clip inner side 28 of each of the upper clip 14 and the lower clip 16 to bias the clip body 12 towards the closed position. The torsion spring 43 may have a pair of extensions 44 extending at an angle to engage the upper clip 14 and the lower clip 16.

A pair of pads 46 comprises an upper pad 48 and a lower pad 50 coupled to the clip inner side 28 of the upper clip 14 and the lower clip 16, respectively. Each pad 46 of the pair of pads may extend between the pair of pivot ears 30 and the grip portion 34. Each pad 46 of the pair of pads may be wedge-shaped and dimensioned such that an upper inner pad face 52 of the upper pad 48 and a lower inner pad face 54 of the lower pad 50 lie parallel when the clip body 12 is in the closed position in order to more evenly apply pressure. The upper inner pad face 52 and the lower inner pad face 54 may be spaced apart and define a grip space 56 therebetween. The pair of pads 46 is configured to secure a pair of arms 58 of a pair of glasses 60. Each pad 46 of the pair of pads may be a resilient material such as, but not limited to, rubbers, foams, and the like in order to conform to the geometry of the pair of arms 58 and to firmly secure said arms 58 without causing damage. The grip space 56 is dimensioned to be thinner than the thickness of the pair of arms 58 to secure the pair of glasses 60 without requiring significant deformation of the pads 46.

In use, the clip body 12 is moved to the open position by applying pressure to the clip outer side 26 of each of the upper clip 14 and the lower clip 16. The pair of arms 58 of the pair of glasses is placed between the pair of pads 46 and the grip portion 34 is placed onto the article of clothing 35 or other desired object to attach the pair of glasses 60 to. The pressure is then released from the clip body 12 and the torsion spring 43 engages the clip body to the closed position to secure the pair of glasses 60 to the article of clothing 35.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A padded glasses clip apparatus comprising:
   a clip body comprising an upper clip and a lower clip, each of the upper clip and the lower clip having a clip back end, a clip front end, a clip left side, a clip right side, a clip outer side, and a clip inner side, each of the upper clip and the lower clip having a pair of pivot ears extending from the clip inner side, each pivot ear having a pivot aperture extending therethrough, the pair of pivot ears of the lower clip being positioned adjacent the pair of pivot ears of the upper clip such that the pivot aperture of each pivot ear is aligned, the clip inner side of each of the upper clip and the lower clip having a grip portion adjacent the clip front end;
   a pivot rod coupled to the clip body, the pivot rod extending through the pivot aperture of each pivot ear, the clip body pivoting on the pivot rod between a closed position with the clip front end of the upper clip contacting the clip front end of the lower clip and an open position with the clip back end of the upper clip contacting a clip back end of the lower clip;
   a torsion spring coupled to the pivot rod, the torsion spring being positioned around the pivot rod and engaging the clip inner side of each of the upper clip and the lower clip to bias the clip body towards the closed position; and
   a pair of pads coupled to the clip body, the pair of pads comprising an upper pad and a lower pad coupled to the clip inner side of the upper clip and the lower clip, respectively, and extending between the pair of pivot ears and the grip portion, the pair of pads being configured to secure a pair of arms of a pair of glasses.

2. The padded glasses clip apparatus of claim 1 further comprising each pad of the pair of pads being wedge-shaped and dimensioned such that an upper inner pad face of the upper pad and a lower inner pad face of the lower pad lie parallel when the clip body is in the closed position.

3. The padded glasses clip apparatus of claim 2 further comprising the upper inner pad face and the lower inner pad face being spaced apart and defining a grip space therebetween.

4. The padded glasses clip apparatus of claim 1 further comprising the grip portion of each of the upper clip and the lower clip having a claw hook adjacent the clip front end and a plurality of teeth adjacent the claw hook, the claw hook of the upper clip overlapping and lying parallel to the claw hook of the lower clip when the clip body is in the closed position.

5. The padded glasses clip apparatus of claim 4 further comprising the claw hook of the upper clip being longer than the claw hook of the lower clip.

6. The padded glasses clip apparatus of claim 4 further comprising each tooth of the plurality of teeth being triangular prismatic and having a point, the point of each tooth of the plurality of teeth of the upper clip contacting the point of the opposing tooth of the plurality of teeth of the lower clip when the clip body is in the closed position.

7. The padded glasses clip apparatus of claim 4 further comprising the clip front end of each of the upper clip and the lower clip being rounded between the clip outer side and the claw hook.

8. The padded glasses clip apparatus of claim 1 further comprising the clip back end of each of the upper clip and the lower clip being rounded.

9. A padded glasses clip apparatus comprising:
a clip body comprising an upper clip and a lower clip, each of the upper clip and the lower clip having a rounded clip back end, a clip front end, a clip left side, a clip right side, a clip outer side, and a clip inner side, each of the upper clip and the lower clip having a pair of pivot ears extending from the clip inner side, each pivot ear having a pivot aperture extending therethrough, the pair of pivot ears of the lower clip being positioned within the pair of pivot ears of the upper clip such that the pivot aperture of each pivot ear is aligned, the clip inner side of each of the upper clip and the lower clip having a grip portion adjacent the clip front end, the grip portion of each of the upper clip and the lower clip having a claw hook adjacent the clip front end and a plurality of teeth adjacent the claw hook, the clip front end being rounded between the clip outer side and the claw hook, each tooth of the plurality of teeth being triangular prismatic and having a point;

a pivot rod coupled to the clip body, the pivot rod extending through the pivot aperture of each pivot ear, the clip body pivoting on the pivot rod between a closed position with the clip front end of the upper clip contacting the clip front end of the lower clip and an open position with the clip back end of the upper clip contacting a clip back end of the lower clip, the claw hook of the upper clip overlapping and lying parallel to the claw hook of the lower clip when the clip body is in the closed position, the claw hook of the upper clip being longer than the claw hook of the lower clip, the point of each tooth of the plurality of teeth of the upper clip contacting the point of the opposing tooth of the plurality of teeth of the lower clip when the clip body is in the closed position;

a torsion spring coupled to the pivot rod, the torsion spring being positioned around the pivot rod between the pair of pivot ears of the lower clip and engaging the clip inner side of each of the upper clip and the lower clip to bias the clip body towards the closed position; and a pair of pads coupled to the clip body, the pair of pads comprising an upper pad and a lower pad coupled to the clip inner side of the upper clip and the lower clip, respectively, and extending between the pair of pivot ears and the grip portion, each pad of the pair of pads being wedge-shaped and dimensioned such that an upper inner pad face of the upper pad and a lower inner pad face of the lower pad lie parallel when the clip body is in the closed position, the upper inner pad face and the lower inner pad face being spaced apart and defining a grip space therebetween, the pair of pads being configured to secure a pair of arms of a pair of glasses.

\* \* \* \* \*